United States Patent [19]

Okada

[11] Patent Number: 4,883,358

[45] Date of Patent: Nov. 28, 1989

[54] FIBER OPTIC GYRO STABILIZED BY HARMONIC COMPONENTS OF DETECTED SIGNAL

[75] Inventor: Kenichi Okada, Oume, Japan

[73] Assignee: Japan Aviation Electronics Industry Limited, Tokyo, Japan

[21] Appl. No.: 236,435

[22] Filed: Aug. 25, 1988

[30] Foreign Application Priority Data

| Sep. 2, 1987 | [JP] | Japan | 62-220758 |
| Sep. 2, 1987 | [JP] | Japan | 62-220759 |
| Apr. 15, 1988 | [JP] | Japan | 62-93210 |
| Jun. 3, 1988 | [JP] | Japan | 62-137781 |

[51] Int. Cl.$^4$ ............................................. G01B 9/02
[52] U.S. Cl. ............................................. 356/350
[58] Field of Search ...................................... 356/350

[56] References Cited

U.S. PATENT DOCUMENTS 4,796,993  1/1989  Sonobe et al. ................. 356/350

FOREIGN PATENT DOCUMENTS 62-12812  1/1987  Japan ............................ 356/350

Primary Examiner—Vincent P. McGraw
Attorney, Agent, or Firm—Pollock, Vande Sande & Priddy

[57] ABSTRACT

Light waves are allowed to pass clockwise and counterclockwise through a circuit optical path of at least one loop, and the light waves having passed through the optical path are interfered with each other. Phase modulator is inserted in one end of the circular optical path, by which the light waves are phase modulated. The intensity of the interference light is detected, as an electric signal, by a photodetector. The fundamental wave component of the modulation frequency of the phase modulator, contained in the electric signal converted by the photodetector, is synchronously detected by a first synchronous detector, from which is output a signal corresponding to an input angular velocity. Second and fourth harmonic components of the modulation frequency of the phase modulator, contained in the electric signal, are synchronously detected by second and third synchronous detectors. The phase modulator is controlled so that the ratio between the outputs from the second and third synchronous detectors is always equal to a preset reference value.

10 Claims, 13 Drawing Sheets

FIBER OPTIC GYRO STABILIZED BY HARMONIC COMPONENTS OF DETECTED SIGNAL

BACKGROUND OF THE INVENTION

The present invention relates to a fiber optic gyro which allows light waves to pass clockwise and counterclockwise through a circular optical path of at least one loop, makes the light waves interfere with each other, and measures from the resulting interference light an angular velocity applied to the optical path.

FIG. 1 shows a conventional fiber optic gyro. Light 18 emitted from a light source 11 is provided via an optical coupler/splitter 12 and a polarizer 13 to an optical coupler/splitter 14, by which it is split into light waves 19 and 20 for propagation in opposite directions through a circular optical path 16 which makes at least one loop. A phase modulator 15 is connected in cascade between the optical coupler/splitter 14 and the optical path 16. The output of an oscillator 27 is provided via a phase modulator drive circuit 28 to the phase modulator 15, by which the light waves 19 and 20 are phase modulated. The light waves 19 and 20 having passed through the optical path 16 are applied as interference light 21 to a photodetector 17 via the optical coupler/splitter 12. The intensity $I_0$ of the interference light 21 in this instance is given by the following equation (1):

$$I_0 = C\left[1 + \cos\Delta\phi\left(J_0(x) + 2\sum_{n=1}^{\infty}(-1)^n \cdot J_{2n}(x) \cdot \cos 2n(\omega t + \theta)\right) - \sin\Delta\phi\left(2\sum_{n=0}^{\infty}(-1)^n \cdot J_{2n+1}(x) \cdot \cos(2n+1)(\omega t + \theta)\right)\right] \quad (1)$$

In the above C is a constant, $J_n(x)$ is an nth order Bessel function of the first kind, x is $2A \sin \pi f_m \tau$, where A is the amplitude of a light phase-modulating signal and $\tau$ is the time for the propagation of the light waves through the optical path 16, $\omega$ is the driving frequency of the phase modulator 15 (where $\omega = 2\pi f_m$), $\Delta\phi$ is the phase difference between the light waves having propagated through the optical path 16 in opposite directions (where $\Delta\phi = 4\pi RL\Omega/(c\lambda)$, R being the radius of the optical path 16 L the length of the optical path 16, c the velocity of light, $\lambda$ the wavelength of light, and $\Omega$ an angular velocity applied to the optical path 16 in its circumferential direction), and $\phi$ is the phase difference between a drive voltage $V_{pm}$ applied to the phase modulator 15, $V_{pm} = A \sin \omega t$, and the phase-modulated light.

As is evident from Eq. (1), the intensity $I_o$ of the interference light 21 contains a term proportional to cos $\Delta\phi$ and a term proportional to sin $\Delta\phi$. Since the interference light detecting sensitivity increases when the phase difference $\Delta\phi$ is within a range of approximately $\pm\pi/4$ about each of $\pm m\pi$ (where m=0, 1, 2, ...), the component proportional to sin $\Delta\phi$ in the output of the photodetector 16 is detected by a synchronous detector 22. Setting a reference signal $V_{r1a}$ in the synchronous detector 22 as follows:

$$V_{r1a} = \frac{4}{\pi}\sum_{n=0}^{\infty}\frac{1}{2n+1}\sin(2n+1)(\omega t + \theta_f) \quad (2)$$

where $\phi_f$ is the phase difference between the drive voltage applied to the phase modulator 15, $V_{pm} = A \sin \omega t$, and the phase-modulated light, the output $V_{1a}$ of the synchronous detector 22 will become as follows:

$$V_{1a} = K_1 J_1(x) \sin \Delta\phi \cos(\theta - \theta_f) \quad (3)$$

where $K_1$ is a constant. Furthermore, since the interference detecting sensitivity increases when the phase difference $\Delta\phi$ is within a range of approximately $\pm\pi/4$ about each of $\pm(2m+1)\cdot\pi/2$ (where m=0, 1, 2, ...), the component proportional to cos $\Delta\phi$ in the output of the photodetector 17 is detected by a synchronous detector 23. Setting a reference signal $V_{r2a}$ in the synchronous detector 23 as follows:

$$V_{r2a} = \frac{4}{\pi}\sum_{n=0}^{\infty}\frac{1}{2n+1}\sin\{2(2n+1)(\omega t + \theta_f)\} \quad (4)$$

the output $V_{2a}$ of the synchronous detector 23 will become as follows:

$$V_{2a} = K_2 J_2(x) \cos \Delta\phi \cos 2(\theta - \theta_f) \quad (5)$$

where $K_2$ is a constant. The outputs of the synchronous detectors 22 and 23 are applied to low-pass filters 24 and 25, whose outputs $V_{1a}$ and $V_{2a}$ are provided to terminals 29 and 30, respectively. The output of the oscillator 27 is applied as the reference signal $V_{r2a}$ to the synchronous detector 23 and at the same time it is applied as the reference signal $V_{1a}$ to the synchronous detector 22 via a logic circuit 26.

To enlarge the dynamic range of the fiber optic gyro, the synchronous detector output $V_{1a}$ or $V_{2a}$ is derived as an output $V_0$, depending on whether the phase difference $\Delta\phi$ is in the range of $\pm\pi/4$ about $\pm m\pi$ or $\pm(2m+1)\pi/2$ (where m=0, 1, 2, ...), and the number of times of switching between the synchronous detector outputs $V_{1a}$ and $V_{2a}$ is measured, thereby obtaining angular velocity information $\Omega_i$ from the following equation (6):

$$\Omega_i = \frac{C\lambda}{4RL}\left(\frac{m\pi}{2} + KV_o\right) \quad (6)$$

where K[rad/v] is a conversion gain. That is, in FIG. 2 the component proportional to sin $\Delta\phi$(signal 72 in FIG. 3) and the component proportional to cos $\Delta\phi$(a signal 73 in FIG. 3) are applied to the terminals 29 and 30, respectively. The signal proportional to sin $\Delta\phi$ and the signal proportional to cos $\Delta\phi$ are switched therebetween in a switch 61 by an output D from that one of terminals of a reversible counter 70 which is weighted $2^0$. The output of the switch 61 is polarity inverted in a switch 62 by an output E from that one of the terminals of the reversible counter 70 which is weighted $2^1$, and the polarity-inverted output is provided to a gyro output terminal 65 via a linearizer 64. The output of the switch 62 is applied to a non-inverting input terminal and an inverting input terminal of comparators 66 and 67, respectively, wherein it is compared with reference voltages $+V_r$ and $-V_r$ of reference power supplies 68 and 69. The outputs of the comparators 66 and 67 are provided to up-and down-count terminals UP and DOWN of the reversible counter 70, in which they are counted up and down, respectively. The output D at the output terminal of the reversible counter 70, weighted $2^0$, is applied as a switching control signal to the switch 61, and the output E at the output terminal weighted $2^1$ is applied as a switching control signal to the switch 62. The switches 61 are each changed over to a terminal NC in the initial state (in which the switching control signal is as logic "0") and is altered to a terminal NO when the switching control signal is a logic "1". The count value of the reversible coutner 70 can be derived from a terminal 71.

As referred to previously, the output at the terminal 29 varies in proportion to $\sin \Delta\phi$ as shown by the curve 72 in row A of FIG. 3, while the output at the terminal 30 varies in proportion to $\cos \Delta\phi$ as shown by the curve 73 in row A of FIG. 3. When the phase difference $\Delta\phi$ is in the range of $\pm \pi/4$, the switches 61 and 62 each remain in the state shown in FIG. 2 and the output from the terminal 29, which is proportional to $\sin \Delta\phi$, is linearized by the linearizer 64, thereafter being provided to the gyro output terminal 65. When the input to the comparator 66, i.e. the output from the switch 62 exceeds the reference voltage $V_r$, pulses will be produced as shown in row B of FIG. 3. The pulses are additively counted by the reversible counter 70.

On the other hand, when the output of the switch 62 exceeds the reference voltage $-V_r$ in the negative direction, pulses will be created as shown in row C of FIG. 3 and subtractively counted by the reversible counter 70. The output D of the reversible counter 70, weighted $2^0$, varies as shown in row D of FIG. 3, and the output E weighted $2^1$ varies as shown in row E of FIG. 3. When the $2^0$-weighted output D of the reversible counter 70 is high-level (logic "1"), the switch 61 is changed over and the signal at the terminal 30, that is, the output proportional to $\cos \Delta\phi$ is linearized and then provided to the gyro output terminal 65. Conversely, when the output of the switch 62 becomes larger than the reference voltage $-V_r$ in the negative direction, the comparator 67 yields pulses, which are subtractively counted by the reversible counter 70. In consequence, the $2^0$-weighted output D goes high, by which the switch 61 is actuated and, as is the case with the above, the signal at the terminal 30, i.e. the output proportional to $\cos \Delta\phi$ is linearized and then provided to the gyro output terminal 65.

When the phase difference $\Delta\phi$ increases in absolute value and the output proportional to $\cos \Delta\phi$ exceeds the reference voltage $+V_r$ or $-V_r$ in absolute value, pulses are produced from the comparators 66 and 67 and are additively or subtractively counted by the reversible counter 70, the switch 61 is returned to its initial position, and the signal 29, that is, the output proportional to $\sin \Delta\phi$ is linearized and provided to the gyro output terminal 65. At the same time, a signal polarity inversion command (a switching control signal) is provided by the $2^1$-weighted output E of the reversible counter 70 so that the outputs proportional to $\sin \Delta\phi$ and $\cos \Delta\phi$ become positive relative to the phase difference $\Delta\phi$, and the switch 62 is connected to an inverter 63. In the above, if the output voltages of the switch 62, which are proportional to $\sin \Delta\phi$ and $\cos \Delta\phi$ when the phase difference $\Delta\phi$ is $\pi/4$, are set slightly lower than the reference voltages $+V_r$ and $-V_r$ in absolute value, then a sawtooth output can be obtained in the output terminal 65 as shown in row G of FIG. 3 and a hysteresis can be provided in the switching between the signals proportional to $\sin \Delta\phi$ and $\cos \Delta\phi$, ensuring a stable operation. In this way, when the phase difference $\Delta\phi$ is in the range of around $\pm \pi/4$ about $\pm m\pi$, the $\sin \Delta\phi$ component is provided as the gyro output and when the phase difference is in the range of around $\pm \pi/4$ about $\pm(2m+1) \pi/2$, the $\cos \Delta\phi$ component is provided as the gyro output, by which the output can be obtained with a high degree of linearity throughout the entire range thereof. From this output the angular velocity can be obtained using Eq. (6). In Eq. (6) $V_0$ is the voltage at the gyro output terminal 65 and m is the difference between the total numbers of pulses added and subtracted by the reversible counter 70, that is, the count value of the reversible counter 70, which is derived from the terminal 71.

For appropriate extraction of the $\sin \Delta\phi$ and $\cos \Delta\phi$ components from the photoelectric conversion output signal of the photodetector 17 it is necessary that the signal to be detected and the reference signal in each synchronous detector be substantially in phase with each other.

However, the phase difference $\theta$ between the drive voltage $V_{pm}$ which is applied to the phase modulator 15 and the fundamental frequency component of the interference light (the phase difference in the high-frequency component assumes a value multiplied by the harmonic order concerned as indicated by Eq. (1)) changes with the surrounding conditions, in particular, temperature to which the phase modulator 15 is exposed. Since the phase modulator 15 is made, for example, by winding an optical fiber around a cylindrical electrostrictive vibrator, its input/output phase chracteristic is essentially liable to vary with the surrounding conditions. In addition, when the operating point of the phase modulator 15 is set at its resonance point, the input/output phase characteristic becomes markedly variable with the surrounding conditions. Incidentally, the operating point of the phase modulator 15 is usually set at its resonance point. On this account, the signal to be detected and the reference signal in each of the synchronous detectors 22 and 23 are not in phase with each other, incurring variations in the scale factor of the outputs $V_{1a}$ and $V_{2a}$ as seen from Eqs. (3) and (5). This is nothing but a change in the gyro output $V_0$, resulting in an error in the measurement of the angular velocity by the fiber optic gyro whose input range is intended to be enlarged, as will be seen from Eq. (6).

Conventionally the following method has been used to stabilize the scale factor. FIG. 4 illustrates a functional block diagram of a scale factor stabilizer circuit by which the amplitude $K_1 \cdot J_1(x)$ of the output $V_{1a}$ in Eq. (3) is held constant. The output of the photodetector 17 is applied to synchronous detectors 31 and 32, in which synchronous detection is carried out at a phase modulating frequency $f_0$ and a frequency $2f_0$ twice higher than the former, respectively. The outputs of the synchronous detectors 31 and 32 are squared by squaror circuits 33 and 34, respectively, and their square output $V_1^2$ and $V_2^2$ are added together by an adder 35, whose output voltage V becomes as follows:

$$V = V_1^2 + V_2^2 = (K_1 \cdot P_0 \cdot J_1(x))^2 \cdot \sin^2 \Delta\phi + (K_2 \cdot P_0 \cdot J_2(x))^2 \cdot \cos^2 \Delta\phi \quad (7)$$

where $K_1$ and $K_2$ are constants (such as an amplification gain, a photoelectric conversion gain, a synchronous detection gain, etc.). Adjusting the total gain so that $K_1 \cdot P_0 \cdot J_1(x) = K_2 \cdot P_0 \cdot J_2(x)$ and letting the amplitude in this instance be represented by K, the output voltage V becomes, from Eq. (7), as follows:

$$V = K^2 \cdot (\sin^2 \Delta\phi + \cos^2 \Delta\phi) = K^2 \quad (8)$$

Now, let the initial value or reference value of the output voltage V be represented by $K_R{}^2$. By detecting the difference between the reference value $K_R{}^2$ of a reference level generator 36 and the output voltage V with a differential amplifier 37 and negatively feeding back the difference to a light power control circuit 39 via an integrator 38, the amplitude of the output $V_1$ can be maintained constant even if the power of light from the light source, an optical transmission loss and the polarized state of light vary.

This will be described in concrete terms. If a maximum power of light $P_0$ arriving at the photodetector 17 is reduced by some cause and the voltage V drops below the reference value $K_R{}^2$ of the reference signal generator 36, the differential amplifier 37 will yield a positive signal. By setting the system with this positive signal so that the power of light which is emitted from the light source 11 increases, the maximum power of light $P_0$ which reaches the photodetector 17 will increase. On the other hand, when the maximum power of light $P_0$ increases by some cause and the voltage V exceeds the reference value $K_R{}^2$, the differential amplifier 37 yields a negative signal, decreasing the power of light which is emitted from the light source 11. As a result of this, the maximum power of light $P_0$ which reaches the photodetector 17 will diminish. Thus, the voltage V can always be held at the reference value $K_R{}^2$. In other words, the amplitude of the output $V_1$ can be retained constant.

The amplitude of the output $V_1$ can similarly be maintained constant also by providing at the stage following the photodetector 17 a gain control circuit whose gain can be varied by an external signal and by a negative feedback thereto the output of the integrator 38.

With the conventional scale factor stabilizer circuit it is necessary, for ensuring stabilization of the scale factor, that the x which is a variable of the Bessel functions of the first kind, $J_1(x)$ and $J_2(x)$, be highly stable. Even if a method for stabilizing the value x is employed, a control error occurs and the value x varies, though slightly. Normally the value x is set to 1.84 at which the output $V_1$ is detected with a maximum sensitivity. With x=1.84, $J_1(x)$ is stable regardless of a change in the value x but $J_2(x)$ which is a coefficient of the output $V_2$ is not stable and readily varies with a change in the value x, as shown in FIG. 5. When the value x undergoes such a change, $K_1 \cdot P_0 \cdot J_1(x) \neq K_2 \cdot P_0 \cdot J_2(x)$ and Eq. (8) does not hold. In other words, the scale factor stabilizer circuit will not normally operate and the scale factor as the input/output characteristic of the fiber optic gyro cannot be held highly stable.

In FIG. 4 reference signals of frequencies $f_0$, $3f_0$ and $2f_0$ are supplied from a reference signal generator 41 to the synchronous detectors 31, 42 and 32, which yield signals $V_1$, $V_3$ and $V_2$, respectively. Since signals $V_1$ and $V_3$ may assume both positive and negative voltages according to positive and negative input angular velocities which are applied to the optical path 16, they are converted by absolute circuits 43 and 44 into absolute values. The absolute circuits 43 and 44 may be replaced by squaror circuits. The output of the absolute circuit 43 is applied to a plus (+) input of a differential amplifier 45 and the output of the absolute circuit 44 is applied to a minus (−) input of the differential amplifier 45.

The output of the differential amplifier 45 is provided via an integrator 46 to the phase modulator drive circuit 28. The phase modulator drive circuit 28 has an arrangement in which the voltage of the signal of the driving frequency $f_0$, which is applied to the phase modulator 15, is increased and decreased by a positive and a negative signal from the differential amplifier 45, respectively. Thus an automatic control loop is provided.

With such an arrangement, when the output of the differential amplifier 45 is zero, that is, when $V_1 = V_3$ (let it be assumed, in this case, that the constants $K_1$ and $K_3$ have been preadjusted to be equal to each other), the voltage which is applied to the phase modulator 15 is adjusted by the phase modulator drive circuit 28 so that the Bessel functions of the first kind $J_1(x)$ and $J_3(x)$ assume the same value, i.e. about 3.05 in terms of the value x at the point A in FIG. 5.

Provided that the amplitude A of the phase modulating signal increases and consequently the value x increases, the Bessel function $J_1(x)$ increases but $J_3(x)$ decreases as indicated at the point A in FIG. 5. As a result of this, the differential amplifier 45 applies a negative signal to the integrator 46, the output of which decreases and the phase modulator drive circuit 28 decreases the voltage of a drive signal to be applied to the phase modulator 15 accordingly, thus causing a decrease in the value of the amplitude A of the phase modulating signal.

On the other hand, in the case where the amplitude A of the phase modulating signal decreases and the value x decreases correspondingly, the first order Bessel function $J_1(x)$ increases but the third order Bessel function $J_3(x)$ decreases as shown in FIG. 5. In consequence, the differential amplifier 45 applies a positive signal to the integrator 46. The integrator 46 increases its output and the phase modulator drive circuit 28 increases the voltage of the drive signal to be applied to the phase modulator accordingly, thus increasing the value of the amplitude A of the phase modulating signal.

In this way, the value x and consequently the sensitivity as the gyro output can be held constant at all times, even if the amplitude A of the phase modulating signal is changed by surrounding conditions or external forces which are applied to the device. The integrator 46 disposed between the differential amplifier 45 and the phase modulator drive circuit 28 is to eliminate a residual deviation of the differential amplifier 45 in the proportional action, thereby maintaining the value x at a target value (x=3.05) at all times.

As mentioned previously, the prior art employs the outputs $V_1$ and $V_3$ of the synchronous detectors 31 and 42 as control signals for stabilization of the phase modulation. The outputs $V_1$ and $V_3$ are expressed by the following equations:

$$V_1 = K_1 \cdot P_0 \cdot J_1(x) \sin \Delta\phi \quad (9)$$

$$V_3 = K_3 \cdot P_0 \cdot J_3(x) \sin \Delta\phi \quad (10)$$

The outputs $V_1$ and $V_3$ are in proportion to $\sin \Delta\phi$. Therefore, when the input angular velocity is zero or extremely small, the outputs are zero or extremely small, making it impossible to effect control for stabilizing the phase modulation. In this instance, the integrator 46 is positively or negatively saturated and the amplitude of the phase modulating signal becomes maximum or minimum. In such a state the gyro cannot respond to a high-speed input, and hence cannot be expected to perform a normal operation for stabilizing the phase modulation and the scale factor.

SUMMARY OF THE INVENTION

It is an object of the present invention to provide a fiber optic gyro which operates stably even if the input angular velocity is zero or extremely small.

Another object of the present invention is to provide a fiber optic gyro in which even if the input/output phase characteristic of the phase modulator varies with a change in the surrounding conditions, a desired input signal and the reference signal in the synchronous detector are held in phase with each other, thereby maintaining the gyro scale factor stably.

Another object of the present invention is to provide a fiber optic gyro in which even if the input/output phase characteristic of the phase modulator varies, the signals to be detected and the reference signal in the synchronous detector are held in phase with each other, thereby stably maintaining the gyro scale factor throughout the input range of the gyro.

Another object of the present invention is to provide a fiber optic gyro in which even if the range of measurement of input angular velocity is enlarged, the circuit for stabilizing the phase modulation operates normally.

Another object of the present invention is to provide a fiber optic gyro which maintains the scale factor as the input/output characteristic thereof highly stable.

Yet another object of the present invention is to provide a fiber optic gyro which has an input/output characteristic which varies continuously with the input angular velocity.

In accordance with an aspect of the present invention, light waves are allowed to pass clockwise and counterclockwise through a circular optical path of at least one loop and the light waves having passed through the optical path are caused by interference means to interfere with each other. A phase modulating means is connected in cascade between the interference means and the optical path, by which the light waves are phase modulated, and the interference light is converted by a photodetector into an electric signal corresponding to the intensity of the interference light. The fundamental frequency component of the phase modulating frequency of the phase modulating means, contained in the electric signal, is synchronously detected by a first synchronous detecting means to obtain an angular velocity signal. Second and fourth harmonic components of the phase modulating frequency, contained in the output electric signal of the photodetector, are synchronously detected by second and third synchronous detecting means. The phase modulating means is controlled so that the ratio between the outputs of the second and third synchronous detecting means may always be equal to a present reference value.

In accordance with another aspect of the present invention, a second synchronous detecting means is provided for synchronously detecting an even-number harmonic component of the modulating frequency of the phase modulator which is contained in the photodetector output. The output signal from the second synchronous detecting means is used to effect such control that in first synchronous detecting means for synchronously detecting an odd-number harmonic component of the modulating frequency of the phase modulator, contained in the photodetector output, an input signal and a reference signal are substantially in phase with each other and that an input signal and a reference signal in the second synchronous detecting means are essentially displaced 90 degrees apart in phase.

In accordance with another aspect of the present invention, light waves having passed through the optical path in opposite directions are caused to interfere with each other and the resulting interference light is converted by a photodetector into an electric signal. An odd-number harmonic component of the modulating frequency of the phase modulating means, contained in the electric signal, is synchronously detected by first synchronous detecting means. An even-number harmonic component of the modulating frequency of the phase modulating means, contained in the electric signal, is synchronously detected by second synchronous detecting means. The electric signal is synchronously detected by third synchronous detecting means using a reference signal displaced 90 degrees apart in phase from the reference signal of the first synchronous detecting means. Further, the electric signal is synchronously detected by fourth synchronous detecting means using a reference signal displaced 90 degrees apart in phase from the reference signal of the second synchronous detecting means. A first phase detecting means uses the outputs of the first and third synchronous detecting means to detect the phase difference between the reference signal applied to the first synchronous detecting means and the component of the input signal to be synchronously detected. A second phase detecting means uses the outputs of the second and fourth synchronous detecting means to detect the phase difference between the reference signal and the component of the input signal to be synchronously detected in the second synchronous detecting means. The outputs from the first and second phase detecting means are used to effect such control that the reference signal and the signal to be synchronously detected in each of the first and second synchronous detecting means are always in phase with each other.

In accordance with another aspect of the present invention, adjoining odd-number harmonic components of the phase modulating frequency of the phase modulating means, contained in the photodetector output, are synchronously detected by first and second synchronous detecting means, and adjoining even-number harmonic components of the phase modulating frequency are synchronously detected by third and fourth synchronous detecting means. The voltage which is applied to the phase modulating means is controlled by a first phase modulation control means so that the outputs of the first and second synchronous detecting means become equal to each other, and the voltage which is applied to the phase modulating means is controlled by a second phase modulation control means so that the ratio between the outputs of the third and fourth synchronous detecting means is constant.

The voltage which is provided to the phase modulating means is controlled by a third phase modulation control means, in place of the first phase modulation control means, so that the outputs of the first and second synchronous detecting means are provided in a constant ratio.

In accordance with yet another aspect of the present invention, the sine component of the phase difference between the two light waves in the photodetector output is detected by first signal detecting means and the cosine component of the phase difference is detected by second signal detecting means. The first and second signal detecting means are switched by a signal switching means so that the first signal detecting means provides its output when the phase difference is in the range of around ±π/4 about mπ(where m=0, 1, 2, . . .) and the second signal detecting means provides its output when the phase difference is in the range of around ±π/4 about (2m+1)·π/2 (where m=0, ±1, ±2, . . .). The analog quantity into which the number of times of switching between the signals of the first and second signal detecting means is converted and the output from the signal switching means are added together by an adding means.

DESCRIPTION OF THE PREFERRED EMBODIMENTS

Figure 4:
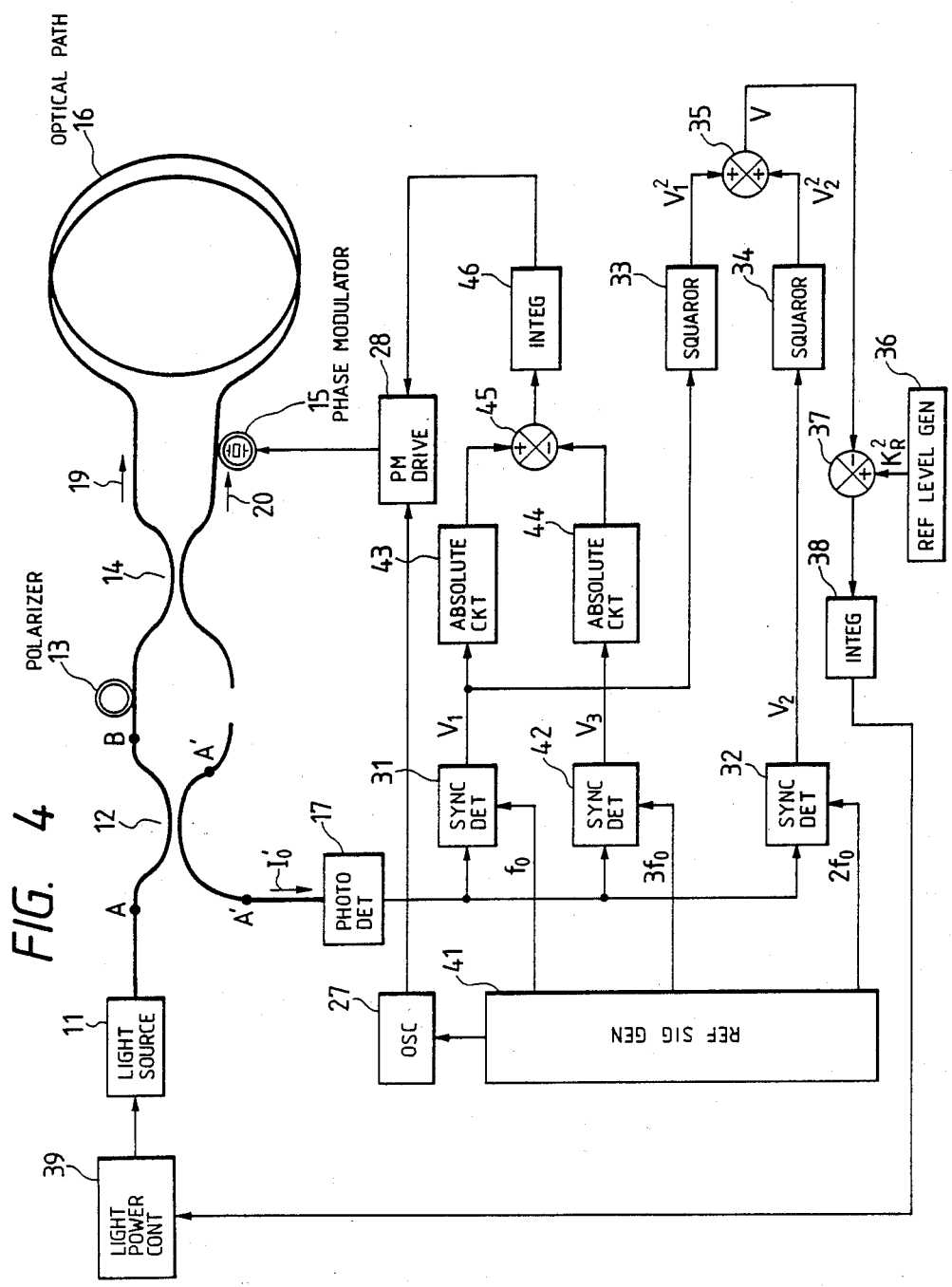
FIG. 4 is a block diagram illustrating a conventional fiber optic gyro including a phase modulation stabilizing circuit.
Figure 6:
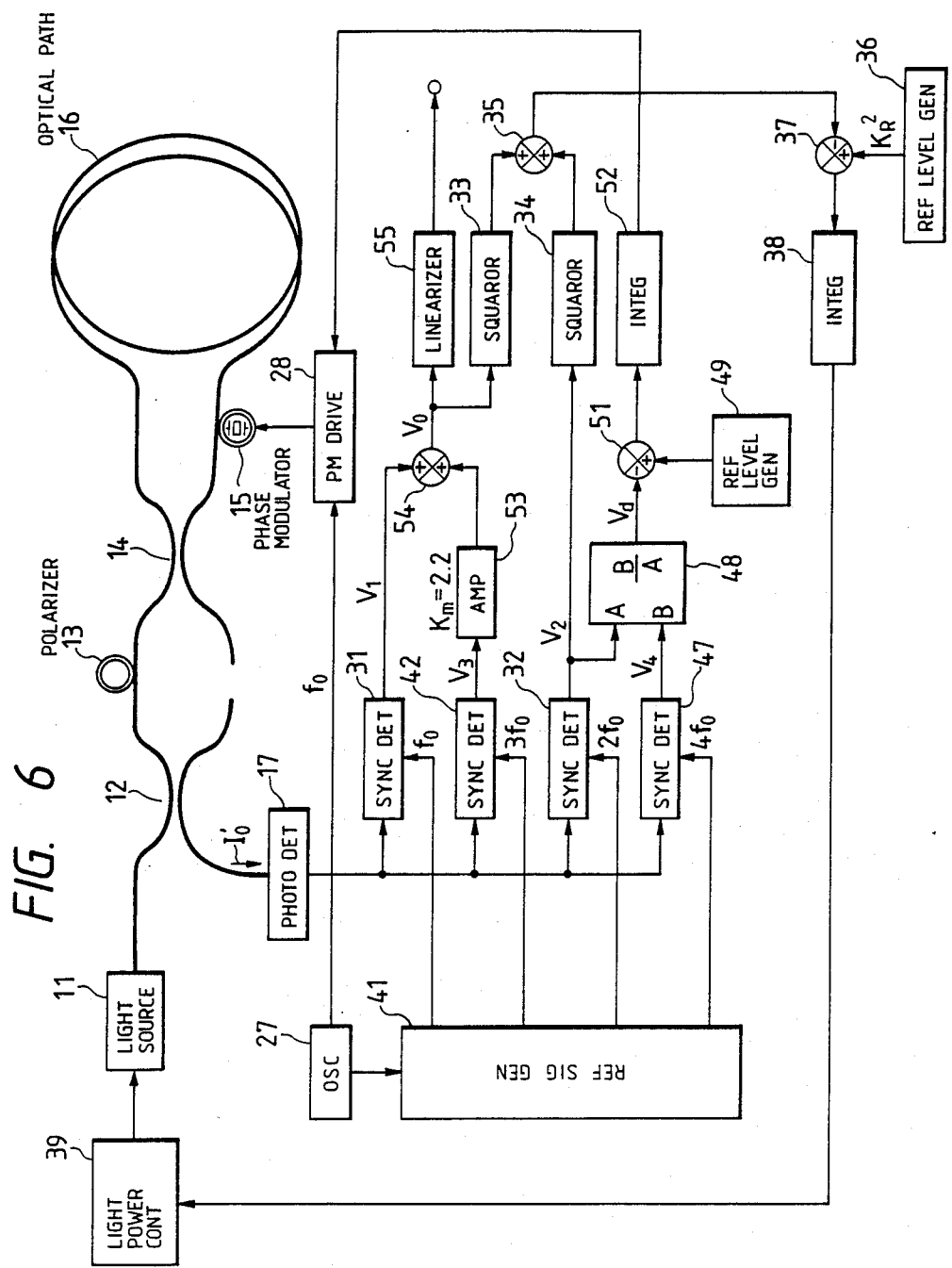
FIG. 6 is a block diagram illustrating an embodiment of the present invention.

FIG. 6 illustrates an embodiment of the present invention, in which parts corresponding to those in FIG. 4 are identified by the same reference numerals. In FIG. 6 synchronous detectors 32 and 47 are supplied with reference signals of frequencies $2f_0$ and $4f_0$ from the reference signal generator 41 and yield signals $V_2$ and $V_4$, respectively. The signals $V_2$ and $V_4$ are expressed as follows:

$$V_2 = K_2 \cdot P_0 \cdot J_2(x) \cos \Delta\phi \quad (11)$$

$$V_4 = K_4 \cdot P_0 \cdot J_4(x) \cos \Delta\phi \quad (12)$$

In a divider 48 the signal $V_4$ is divided by the signal $V_2$ to obtain $$V_d = \frac{V_4}{V_2} = \frac{K_4 \cdot J_4(x)}{K_2 \cdot J_2(x)}$$

By controlling the gains of the synchronous detectors so that $K_2 = K_4$, it follows that $$V_d = J_4(x)/J_2(x) \quad (13)$$

Figure 7:
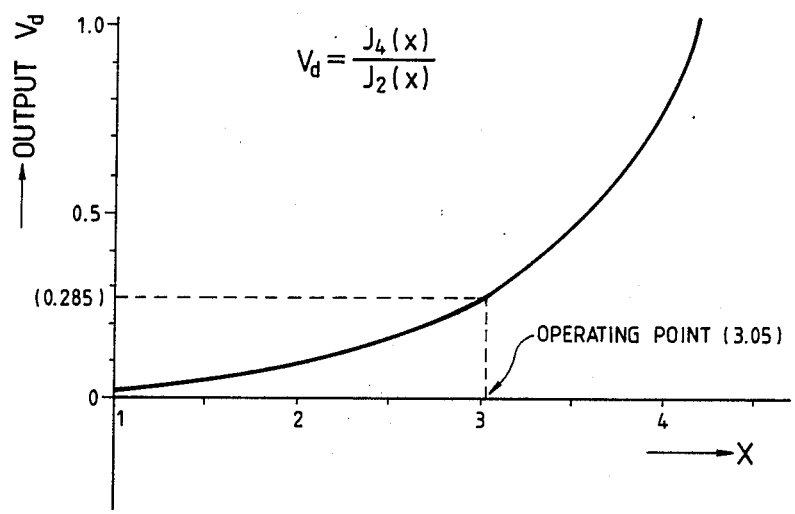
FIG. 7 is a graph showing its $V_d - X$ characteristic.

This sets up between the Bessel functions $J_2(x)$ and $J_4(x)$ a fixed relationship independent of the input angular velocity. FIG. 7 is a graph showing the relationship of $V_d = J_4(x)/J_2(x)$ to the value x, and the value of $V_d$ at the operating point (x=3.05) is about 0.285. By setting the reference value of a reference level generator 49 to 0.285, comparing the reference value and $V_d$ in a differential amplifier 51, negatively feeding back the difference to the phase modulator drive circuit 28 via an integrator 52, and controlling the voltage of the signal which is applied from the oscillator 27 to the phase modulator 15, the value of $V_d$ can always be set to 0.285. In other words, the value x can be held at 3.05.

The phase modulator drive circuit 28 has an arrangement in which the voltage of the signal of the driving frequency $f_0$ which is applied to the phase modulator 15 is increased and decreased by a positive and a negative signal of the differential amplifier 51, respectively; thus, an automatic control circuit is established. If now the amplitude A of the phase modulating signal is increased by some cause and consequently the value x increases, the value of $V_d$ will increase as is evident from FIG. 7. In consequence, the differential amplifier 51 applies the negative signal to the integrator 52, causing its output to decrease. Accordingly, the phase modulator drive circuit 28 decreases the voltage of the signal which is applied to the phase modulator 15, thus decreasing the amplitude A of the phase modulating signal. On the other hand if the amplitude A of the phase modulating signal decreases and the value x also decreases accordingly, the value of $V_d$ will decrease as seen from FIG. 7. In consequence, the differential amplifier 51 applies the positive signal to the integrator 52, by which its output increases, and the phase modulator drive circuit 28 increases the voltage of the signal which is applied to the phase modulator 15, thus increasing the amplitude A of the phase modulating signal.

With such an arrangement, even if the amplitude A of the phase modulating signal is changed by external conditions (such as temperature, vibrations, shocks, etc.), the value x can be held constant at all times and the sensitivity of the gyro output can be retained constant. Although in this embodiment the signal $V_4$ is divided by the signal $V_2$, the signal $V_2$ may also be divided by the signal $V_4$. In such a case, the value of $V_d$ at the operating point (x=3.05) is approximately 3.5. Accordingly, the reference value of the reference level generator 49 needs only to be set to 3.5.

The above is the fiber optic gyro adapted for stable phase modulation according to the present invention. As will be understood from Eqs. (11) and (12), the control signals $V_2$ and $V_4$ which are used in the phase modulation stabilizing circuit shown in FIG. 6 are sufficiently large even if the input angular velocity is zero or extremely small; so that they ensure normal operations for stabilizing the phase modulation and for stabilizing the afore-mentioned scale factor.

The signals $V_2$ and $V_4$ diminish as the input angular velocity increases, but even if the Sagnac phase difference $\Delta\phi$ is 60 degrees, they still have a magnitude of 50% and can sufficiently be used to effect control for stabilizing the phase modulation.

Incidentally, in the case where the light source 11 has a wavelength $\lambda$ of 0.83 $\mu$m and the optical path 16 has a radius R of 0.02 m and a length L of 200 m, a maximum input angular velocity $\Omega$ at the Sagnac phase difference $\Delta\phi$ is approximately 300 degrees per second, which is a sufficiently practicable value.

Although in the above $V_d = J_4(x)/J_2(x)$ at the operating point for the phase modulation is about 0.285 and this value is set as the reference value of the reference level generator 49, it is also possible to set $V_d = K_d \cdot J_4(x)/J_2(x) + B$, where $K_d$ and B are arbitrary values, and to use, as the reference value, the value of $V_d$ at the operating point (x=3.05). For instance, if $K_d$ and B are set to 10 and 0, respectively, then the value of $V_d$ at the operating point (x=3.05) will be about 2.85, to which the reference value of the reference level generator 49 is set.

In FIG. 6 the output signal from the photodetector 17 is synchronously detected by the third harmonic $3f_0$ of the phase modulating frequency $f_0$ in the synchronous detector 42 and the detected output $V_3$ is applied to an amplifier 53, wherein it is amplified $K_m$ times. The amplified output $V_3$ is applied to an adder 54, wherein it is added to the output $V_1$ of the synchronous detector 31 having synchronously detected the photodetector output by the phase modulating frequency $f_0$. The output $V_0$ of the adder 54 is given as follows:

$$V_0 = K_1 \cdot P_0 \cdot J_1(x) \cdot \sin \Delta\phi + K_m \cdot K_3 \cdot P_0 \cdot J_3(x) \cdot \sin \Delta\phi \quad (14)$$

where $K_1$ and $K_3$ are constants (such as the gain of each synchronous detector, the photoelectric conversion gain). By adjusting the gains and setting $K_1 = K_3 = K_0$, Eq. (14) becomes as follows:

$$V_0 = K_0 \cdot P_0 \cdot (J_1(x) + K_m \cdot J_3(x)) \cdot \sin \Delta\phi \quad (15)$$

Figure 5:
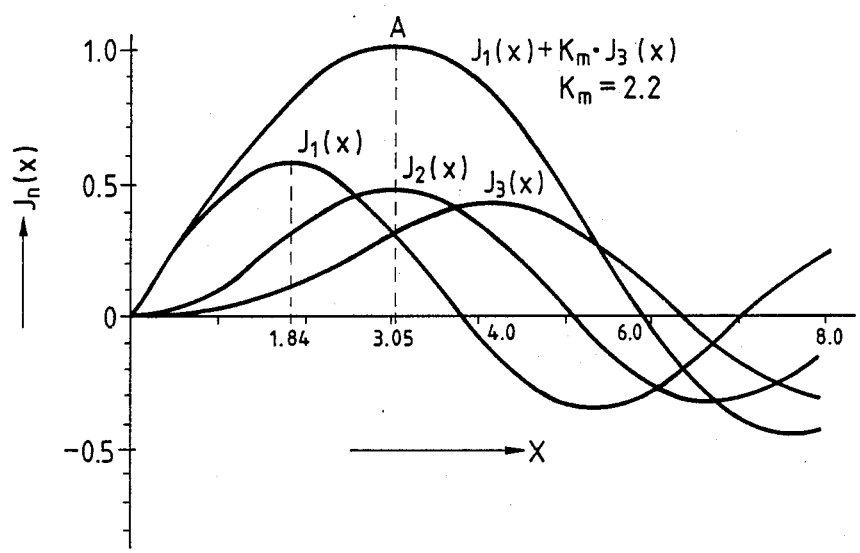
FIG. 5 is a graph showing Bessel functions of the first kind.

By setting $K_m = 2.2$, $(J_1(x) + K_m \cdot J_3(x))$ is maximum at the point where x is substantially equal to 3.05, and is stable in its vicinity, as shown in FIG. 5. At the point x=3.05 the Bessel function $J_2(x)$ is also maximum and stable with respect to x. Then, if $V_0$ is used in place of $V_1$ in Eq. (7), a control error occurs in the circuit for maintaining the value x stable, and even if the value x varies, the amplitudes of the outputs $V_0$ and $V_1$ are always equal and the scale factor stabilizing circuit operates normally. The voltage $V_0$ is stable with respect to the value x, and hence can be used as the output of the fiber optic gyro.

In this embodiment the above output $V_0$ is linearized by a linearizer 55 and then provided as the output $V_{OUT}$ of the fiber optic gyro. The output $V_{OUT}$ in this instance is as follows:

$$V_{OUT} = K_1 \cdot P_0 \cdot J_1(x) \cdot \Delta\phi \quad (16)$$

It is also possible to add the vectors of the output $V_0$ from the adder 54 and the output $V_2$ from the synchronous detector 32, obtain how much the absolute value of the vector sum has deviated from the reference value, and numerically correct the output $V_{OUT}$ in accordance with the deviation.

Figure 8:
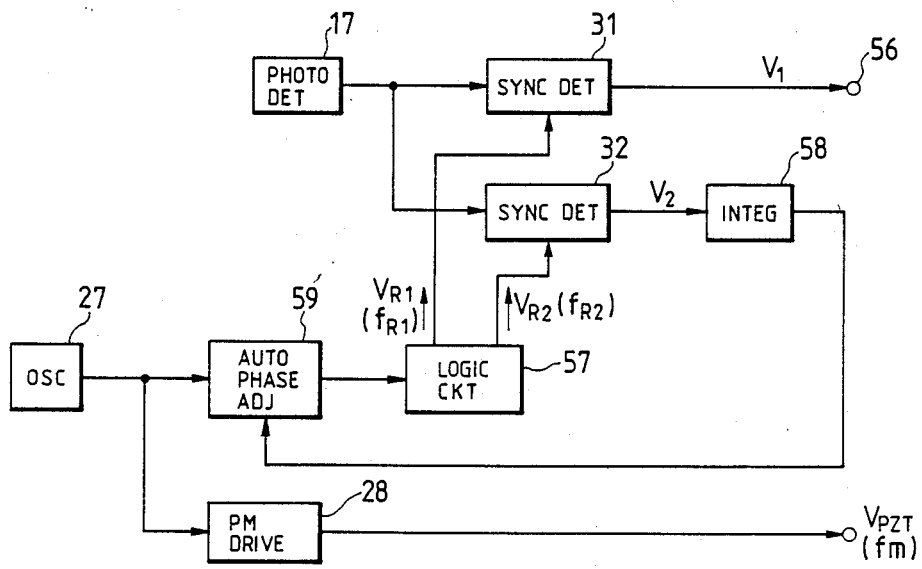
FIG. 8 is a block diagram illustrating the principal part of another embodiment of the present invention.

FIG. 8 illustrates the principal part of another embodiment of the present invention. The output of the photodetector 17 is synchronously detected by the synchronous detector 31 with reference to a reference signal $V_{R1}$ of a frequency $f_{R1}$. The component which is synchronously detected in this case is the component of the fundamental frequency $f_m$ of the signal expressed by Eq. (1), and the detected output is provided to an output terminal 56 of the fiber optic gyro. The signal $V_1$ having its AC component thus removed is in proportion to sin $\Delta\phi$. The output $V_1$ at this time becomes as follows:

$$V_1 = K_1 \cdot \sin \Delta\phi \cdot \cos(\theta - \theta_f) \quad (17)$$

where $K_1$ is a constant and $\theta_f$ is the phase difference between the drive voltage which is applied to the phase modulator 15 and the reference signal $V_{R1}$. Here, the phase difference $\theta$ is the phase difference between the drive voltage which is applied to the phase modulator 15 and the light phase modulating signal, as referred to previously. This phase difference significantly varies with the surrounding conditions, in particular, temperature, making unstable the scale factor of the voltage $V_1$ which is used essentially as the output of the fiber optic gyro.

To avoid this, the present invention employs, for the phase correction, an even-number harmonic of the signal contained in the interference light. In this embodiment a second harmonic component is used. The output of the photodetector 17 is synchronously detected by a reference signal $V_{R2}$ of a frequency $f_{R2}$ in the synchronous detector 32. The phase of the reference signal $V_{R2}$ is set by a logic circuit 57 so that the output $V_2$ is obtained from the synchronous detector 32, where the output $V_2$ is given by the following equation (18):

$$V_2 = K_2 \cdot \cos \Delta\phi \cdot \sin\{2(\theta = \theta_f)\} \quad (18)$$

The signal $V_2$ is provided to an integrator 58, and an automatic phase adjuster 59 which is capable of changing the phase difference $\theta_f$ is controlled by the output of the integrator 58 so that the phase difference $\theta_f$ become equal to the phase difference $\theta$. The output of the oscillator 27 is provided via the automatic phase adjuster 59 to the logic circuit 57, wherein the reference signals $V_{R1}$ and $V_{R2}$ are created. The automatic phase adjuster 59 is controlled so that the difference $(\theta - \theta_f)$ may always be zero, that is, the output of the integrator 58 may always be zero. In consequence, Eq. (17) becomes as follows:

$$V_1 = K_1 \cdot \sin \Delta\phi \quad (19)$$

Even if the phase difference $\theta$ between the input and the output of the phase modulator 15 varies with a change in the surrounding condition, in particular, the ambient temperature, it is possible to suppress the fluctuation of the scale factor which is the input/output characteristic of the fiber optic gyro.

The reason for which the harmonic of the even-numbered order is employed for the phase correction is as follows: As will be seen from Eq. (18), even when the input angular velocity $\Omega$, which is applied to the optical path 16, is zero or very small, that is, even when the phase difference $\Delta\phi$ between the light waves propagating through the optical path 16 in opposite directions is very small, the signal of the even-numbered harmonic is proportional to cos $\Delta\phi$, and hence provides a sufficient large value as the control signal.

On the other hand, an odd-numbered harmonic component is very small when the input angular velocity is small, as will be understood from Eq. (17); so that the harmonic component of the odd-numbered order is not suitable for use as the control signal for the phase modulation.

As will be seen from Eq. (18), however, even in the case of the even-numbered harmonic component being used, an increase in the input angular velocity causes an increase in the phase difference $\Delta\phi$ and the signal $V_2$ as the control signal diminishes correspondingly.

However, in a fiber optic gyro in which the phase difference $\Delta\phi$ between the light waves propagating through the optical path 16 in opposite directions in the case of a maximum input angular velocity is about 45 degrees or less, the reduction of the secondary output $V_2$ is approximately 30% or less and the output $V_2$ can sufficiently be utilized as the control signal.

Figure 1:
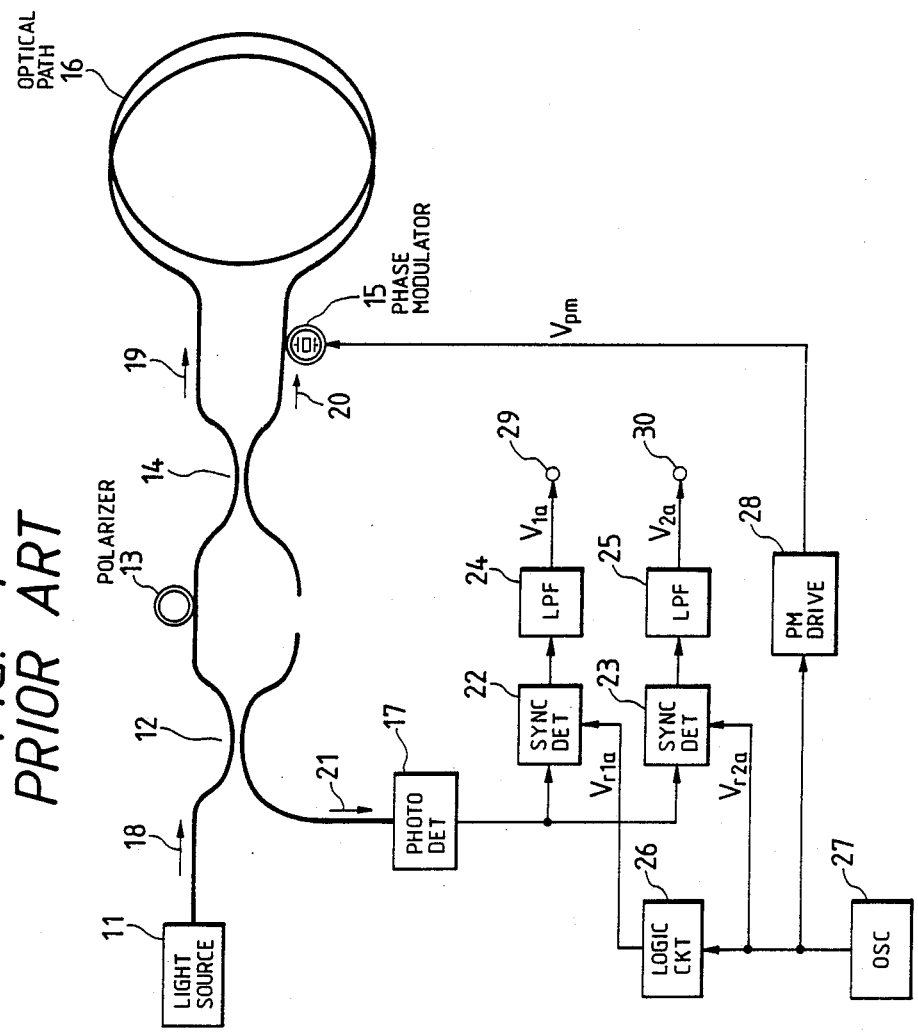
FIG. 1 is a block diagram showing a conventional fiber optic gyro.
Figure 9:
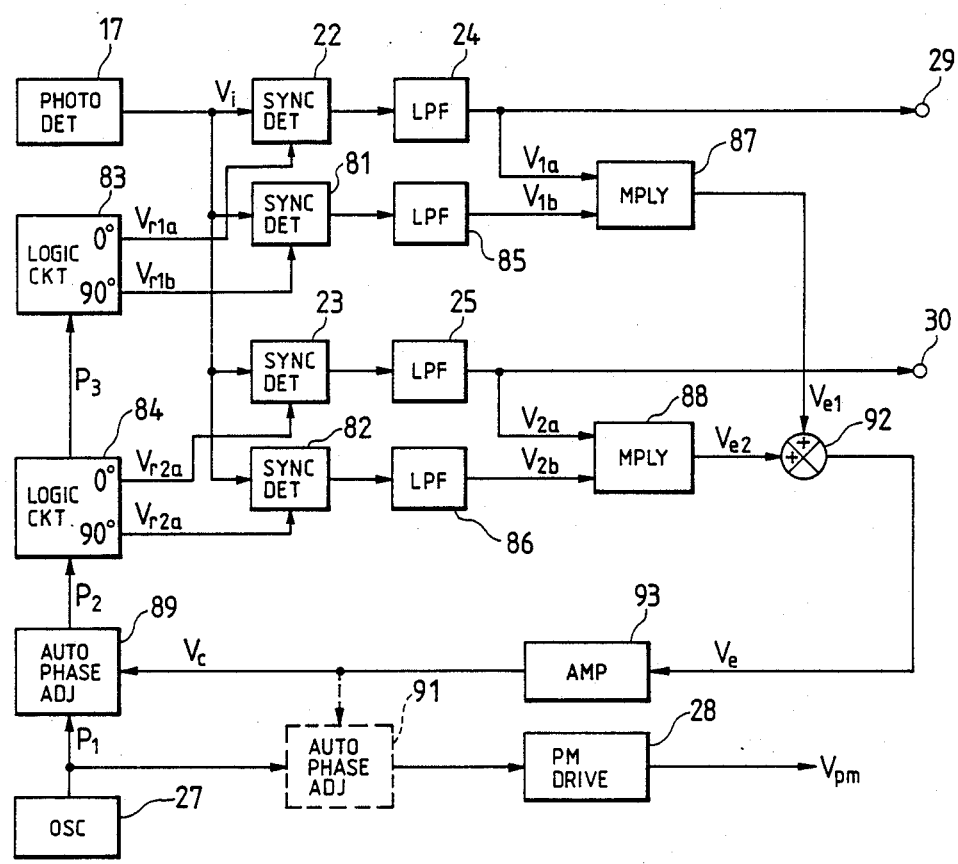
FIG. 9 is a block diagram illustrating the principal part of another embodiment of the present invention.

FIG. 9 illustrates the principal part of another embodiment of the present invention, in which parts corresponding to those in FIG. 1 are identified by the same reference numerals. In this embodiment synchronous detectors 81 and 82 are provided. Logic circuits 83 and 84 create signals $V_{r1b}$ and $V_{r2b}$ which are displaced 90 degrees apart in phase from the reference signals $V_{r1a}$ and $V_{r2a}$ for the synchronous detectors 22 and 23, respectively. The signals $V_{r1b}$ and $V_{r2b}$ are applied as reference signals to the synchronous detectors 81 and 82, in which the output $V_i$ of the photodetector 17 is synchronously detected. The outputs of the synchronous detectors 81 and 82 are provided to low-pass filters 85 and 86, respectively. The outputs $V_{1b}$ and $V_{2b}$ of the low-pass filters 85 and 86 are as follows:

$$V_{1b} = V_i \cdot V_{r1b} = K_{1b} \cdot J_1(x) \cdot \sin \Delta\phi \sin(\theta - \theta_f) \quad (20)$$

$$V_{2b} = V_i \cdot V_{r2b} = K_{2b} \cdot J_2(x) \cdot \cos \Delta\phi \sin 2(\theta - \theta_f) \quad (21)$$

where $K_{1b}$ and $K_{2b}$ are constants. The outputs $V_{1a}$ and $V_{1b}$ of the lowpass filters 24 and 85 are applied to a multiplier 87 which serves as a phase detecting means, and the outputs $V_{2a}$ and $V_{2b}$ of the lowpass filters 25 and 86 are applied to a multiplier 88 which serves as a phase detecting means. The outputs $V_{e1}$ and $V_{e2}$ of the multipliers 87 and 88 are as follows:

$$V_{e1} = V_{1a} \cdot V_{1b} = (K_1 \sin \Delta\phi)^2/2 \cdot \sin 2(\theta - \theta_f) \quad (22)$$

$$V_{e2} = V_{2a} \cdot V_{2b} = (K_2 \cos \Delta\phi)^2/2 \cdot \sin 4(\theta - \theta_f) \quad (23)$$

where:
$K_1 = K_{1a} J_1(x) = K_{1b} J_1(x)$
$K_2 = K_{2a} J_2(x) = K_{2b} J_2(x)$ That is to say, since $\sin \Delta\phi$ and $\cos \Delta\phi$ are respectively squared, the outputs of the multipliers 87 and 88 become positive at all times and their polarity corresponds to the sine output of the phase difference $(\theta - \theta_f)$ and is not affected by the polarity of the input angular velocity, that is, the polarity of the $\sin \Delta\phi$ component and the $\cos \Delta\phi$ component corresponding to the phase difference $\Delta\phi$ between the light waves having passed through the optical path 16 in opposite directions.

Accordingly, the phase difference $(\theta - \theta_f)$ can always be held constant by controlling an automatic phase adjuster 89, disposed at the stage preceding the logic circuits 83 and 84, by the output of each of the multipliers 87 and 88 to thereby change $\theta_f$ corresponding to the phase difference $\theta$. The same effect could also be produced by disposing an automatic phase adjuster 91 at the stage preceding the phase modulator drive circuit 28 as shown by broken line, instead of using the automatic phase adjuster 89, and by controlling the phase relationship of the signal $V_{pm}$, which is applied to the phase modulator 15, to the reference signal of each of the synchronous detectors 22, 23, 81 and 82.

Figure 10:
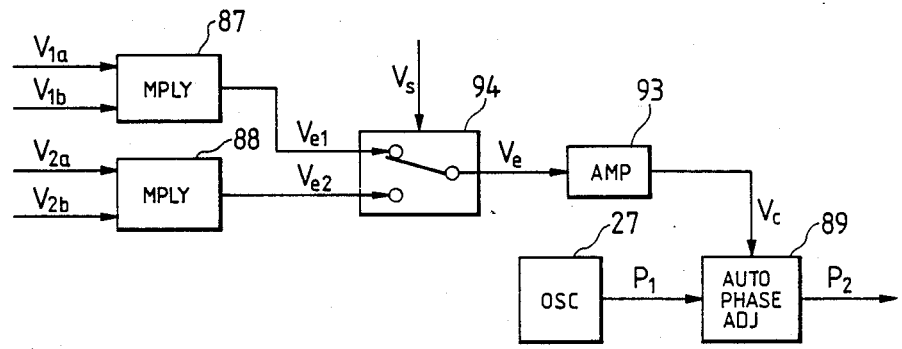
FIG. 10 is a block diagram showing a modified form of the fiber optic gyro depicted in FIG. 9.

In this embodiment the outputs $V_{e1}$ and $V_{e2}$ of the multipliers 87 and 88 are added together by an adder 92, the added output $V_e$ is applied to an amplifier 93 including an electric filter, and the output of the amplifier 93 is used as the control signal for the automatic phase adjuster 89. It is also possible, however, to employ such an arrangement as shown in FIG. 10 in which the outputs $V_{e1}$ and $V_{e2}$ of the multipliers 87 and 88 are selectively applied via a switching means 94 to the amplifier 93 and the amplifier output is used as the control signal. In this instance, the switching means 94 selects the multiplied output $V_{e2}$ of the multiplier 88 which has a sufficiently large value as a signal when the phase difference $\Delta\phi$ is in the range of approximately $\pm\pi/4$ about $\pm m\pi$ (where m=0, 1, 2, ...), and selects the multiplied output $V_{e1}$ of the multiplier 87 which similarly has a sufficiently large value as a signal when the phase difference $\Delta\phi$ is in the range of $\pm\pi/4$ about $\pm(2m+1)\cdot\pi/2$ (where m=0, 1, 2, ...). This can be achieved simply by controlling the switching means 94 with the $2^0$-weighted output D of the reversible counter 70 in FIG. 2.

Figure 11:
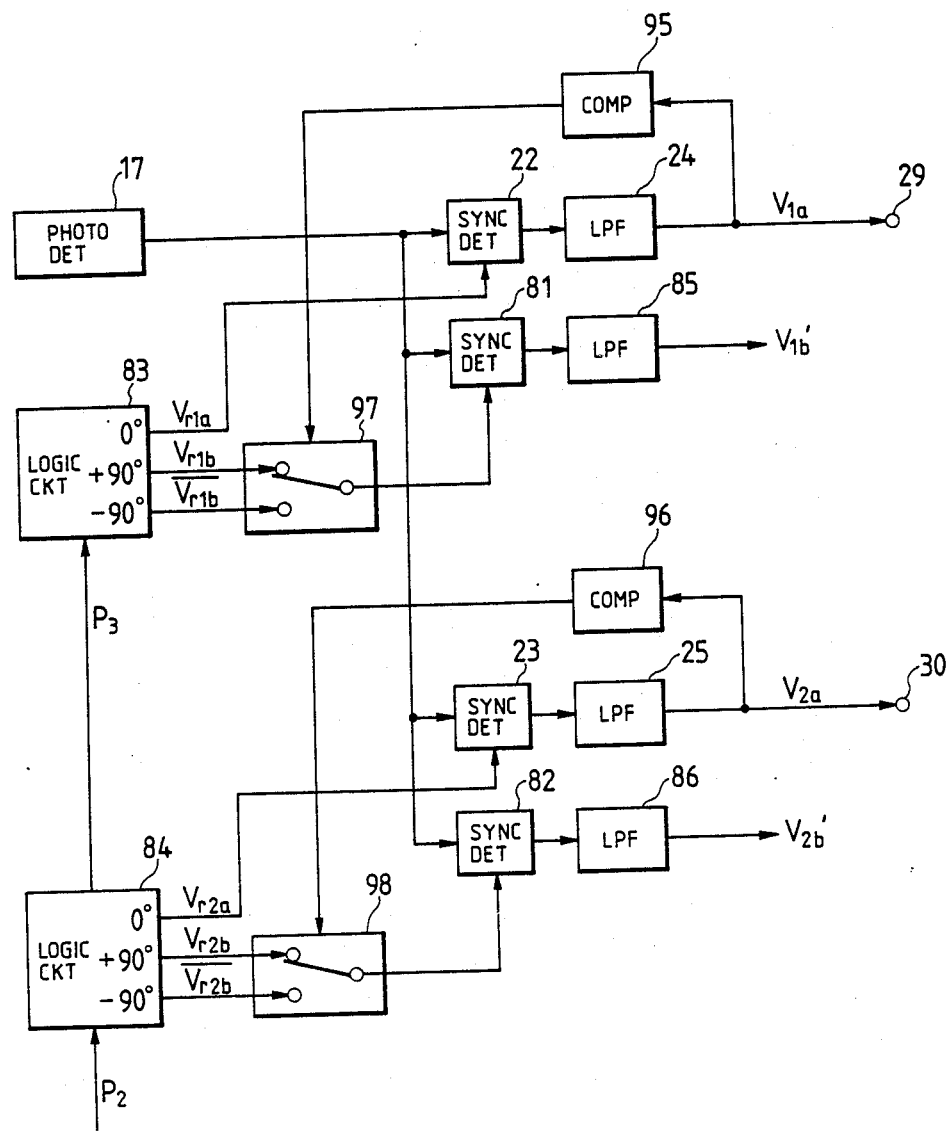
FIG. 11 is a block diagram illustrating the principal part of another embodiment of the present invention.

FIG. 11 illustrates another embodiment of the present invention, in which the phases of the reference signals of the synchronous detectors 81 and 82 are switched between +90 and −90 degrees relative to the reference signals $V_{r1a}$ and $V_{r2a}$ of the synchronous detectors 22 and 23 in accordance with the polarities of the outputs $V_{1a}$ and $V_{2a}$ of the low-pass filters 24 and 25. The polarities of the outputs of the synchronous detectors 81 and 82 are in agreement with the polarities of the outputs of the synchronous detectors 22 and 23. The polarities of the outputs $V_{1a}$ and $V_{2a}$ of the synchronous detectors 22 and 23 are checked by comparators 95 and 96, the outputs of which are applied to switching elements 97 and 98 to control them, switching the reference signals of the synchronous detectors 81 and 82 between signals $V_{r1b}$ and $V_{r1b}$ phased 180 degrees apart and between signals $V_{r2b}$ and $V_{r2b}$ similarly phased 180 degrees apart. That is to say, when the output of each synchronous detector becomes negative, the reference signal 180 degrees out of phase therewith is applied to the detector, making its output positive. As a result of this, the outputs $V_{1b}'$ and $V_{2b}'$ become as follows:

$$V_{1b}' = |K_1 \sin \Delta\phi| \cdot \sin(\theta - \theta_f) \quad (24)$$

$$V_{2b}' = |K_2 \cos \Delta\phi| \cdot \sin 2(\theta - \theta_f) \quad (25)$$

Thus, the phase difference $(\theta - \theta_f)$ information can be output irrespectively of the polarities of the $\sin \Delta\phi$ and $\cos \Delta\phi$ components corresponding to the input angular velocity. The automatic phase adjuster 89 is controlled so that the phase difference $\theta - \theta_f$ is reduced to zero. That is, the outputs $V_{1b}'$ and $V_{2b}'$ are used in place of the signals $V_{e1}$ and $V_{e2}$ shown in FIGS. 9 and 10. Incidentally, the electric filter of the amplifier 93 in FIG. 9 is usually of a proportional plus derivative plus integral type.

Figure 12:
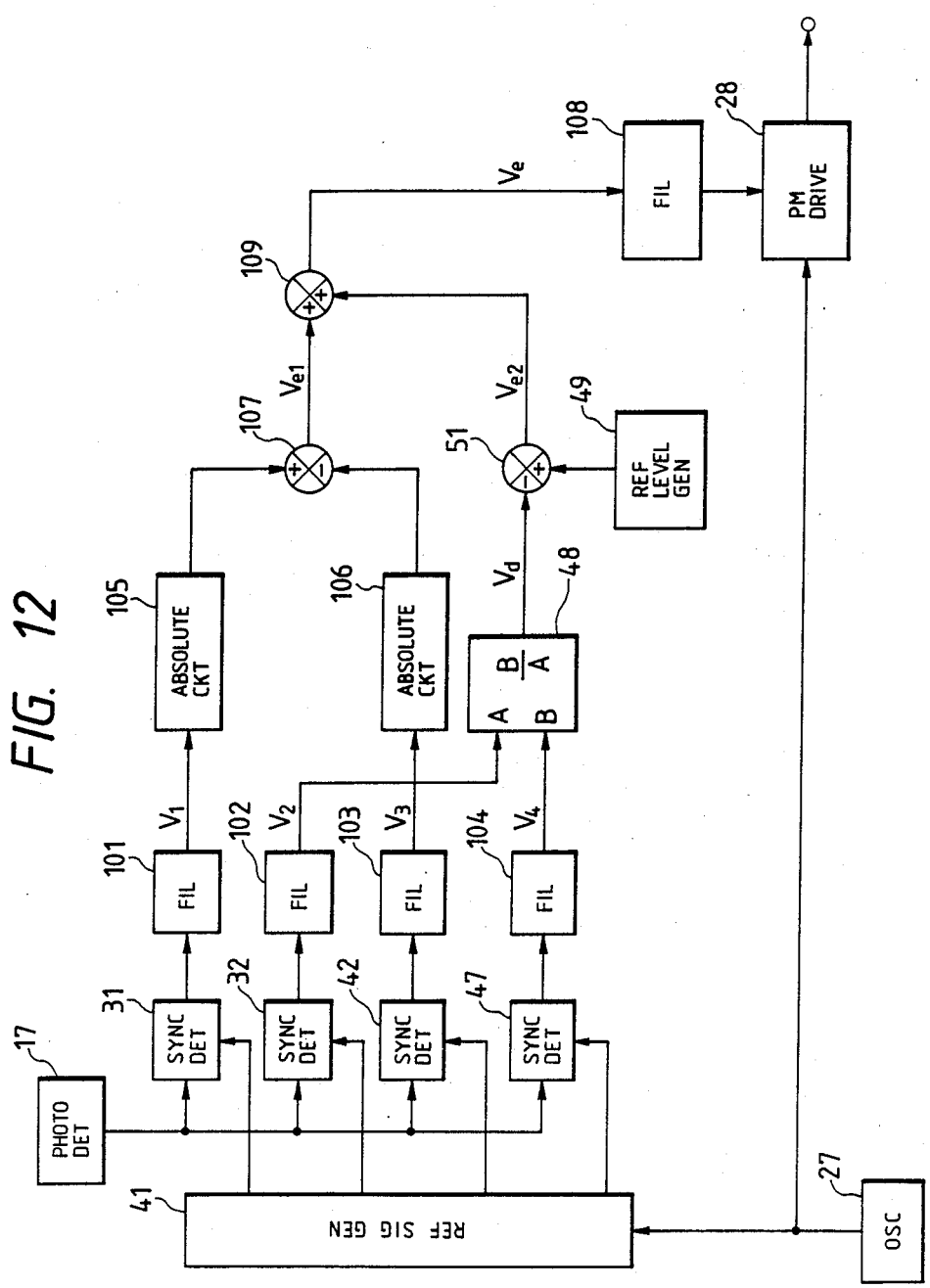
FIG. 12 is a block diagram illustrating the principal part of another embodiment of the present invention.

FIG. 12 illustrates another embodiment of the present invention, in which parts corresponding to those in FIG. 6 are identified by the same reference numerals. The outputs of the synchronous detectors 31, 32, 42 and 47 are applied to electric filters 101, 102, 103 and 104, providing voltages V1, V2, V3 and V4, respectively.

$$V_1 = K_1 \cdot J_1(x) \cdot \sin \Delta\phi$$

$$V_2 = K_2 \cdot J_2(x) \cdot \cos \Delta\phi$$

$$V_3 = K_3 \cdot J_3(x) \cdot \sin \Delta\phi$$

$$V_4 = K_4 \cdot J_4(x) \cdot \cos \Delta\phi$$

Since the signals $V_1$ and $V_3$ become positive or negative depending on whether the input angular velocity which is applied to the optical path 16 is positive or negative, they are converted by absolute circuits 105 and 106 into absolute values. The absolute circuits may also be replaced by circuits which possess a function of squaring the input signal thereto. The output of the absolute circuit 105 is applied to a plus (+) input of a differential amplifier 107 and the output of the absolute circuit 106 is applied to a minus (−) input of the differential amplifier 107.

The phase modulator drive circuit 28 has an arrangement in which the voltage of the signal of the driving frequency $f_0$, which is applied to the phase modulator 15, is increased and decreased by the positive signal and the negative signal of the differential amplifier 107, respectively; thus, an automatic control loop is constituted.

The voltage which is applied to the phase modulator 15 is controlled by the phase modulator drive circuit 28 so that when the output of the differential amplifier 107 is zero, that is, when $V_1 = V_3$ (assume that the constants $K_1$ and $K_3$ have been preadjusted to become equal to each other), the Bessel functions of the first kind $J_1(x)$ and $J_3(x)$ become equal to each other, that is, they reach the point A in FIG. 5 where the value x is about 3.05.

If now the amplitude A of the phase modulating signal increases by some cause and consequently the value x increases, the Bessel function $J_1(x)$ decreases and the Bessel function $J_3(x)$ increases as indicated at the point A in FIG. 5. As a result of this, the differential amplifier 107 applies the negative signal to an electric filter 108. The output of the electric filter 108 decreases, so that the phase modulator drive circuit 28 decreases the voltage to be applied to the phase modulator 15, causing a decrease in the value of the amplitude A of the phase modulating signal.

Where the amplitude A of the phase modulating signal decreases and the value x also decreases accordingly, the first order Bessel function $J_1(x)$ increases and the third order Bessel function $J_3(x)$ decreases as shown in FIG. 5. In consequence, the differential amplifier 107 applies the positive signal to the electric filter 108. The output of the electric filter 108 increases, so that the phase modulator drive circuit 28 increases the voltage to be applied to the phase modulator 15, causing an increase in the value of the amplitude A of the phase modulating signal.

With such an arrangement, even if the value of the amplitude A of the phase modulating signal is changed by external conditions (such as temperature, vibrations, shocks, etc.), the value x can be held constant at all times and the sensitivity of the gyro output can be retained constant.

The electric filter 108 having an integrating function, provided between the differential amplifier 107 and the phase modulator drive circuit 28, is to remove a residual deviation of the differential amplifier 107 in the proportional action, thereby holding the value x at the target value (x=3.05) at all times.

The signals $V_2$ and $V_4$ are provided to the divider 48, wherein the signal $V_4$ is divided by the signal $V_2$, providing between the Bessel functions $J_1(x)$ and $J_3(x)$ a relationship independent of the input angular velocity, as shown by Eq. (13).

The output $V_d$ of the divider 48 is applied to the minus (−) input of the differential amplifier 51, wherein it is compared with the reference value provided from the reference level generator 49. The resulting difference $V_{e2}$ is negatively fed back to the phase modulator drive circuit 28 via the electric filter 108, controlling the voltage which is applied to the phase modulator 15. The reference value of the reference level generator 49 is set to about 0.285 as shown in FIG. 7 when the operating point of the phase modulator 15 is set at x=3.05. The phase modulator drive circuit 28 is arranged so that the voltage of the signal of the drive frequency $f_0$ which is applied to the phase modulator 15 is increased and decreased by the positive signal and the negative signal of the differential amplifier 51, respectively; thus, an automatic control circuit is set up.

With such an arrangement, even if the amplitude A of the phase modulating signal is changed by external conditions (such as temperature, vibrations, shocks, etc.), the value x can always be held constant. Although in this embodiment the signal $V_4$ is divided by the signal $V_2$, the same effect as mentioned above can be produced by dividing the signal $V_2$ by the signal $V_4$. In this instance, the value of the output $V_d$ at the operating point (x=3.05) is around 3.5 and the reference value of the reference level generator 49 is set to 3.5. Usually the output of the divider 48 is multiplied $K_d$ times larger than the value $V_d$ shown by Eq. (13). Therefore, the reference value of the reference level generator 49 is also set to a $K_d$-fold value.

In the embodiment illustrated in FIG. 12 the output error signal $V_{e1}$ of the differential amplifier 107 and the output error signal $V_{e1}$ of the differential amplifier 107 and the output error signal $V_{e2}$ of the differential amplifier 51 are added together by an adder 109, the output of which is provided to the electric filter 108. When the phase difference $\Delta\phi$ is $m\pi$ (where m=0, 1, 2, . . .) and its vicinity, the control signal ($V_1$, $V_3$) is zero or very small and the system using the output of the differential amplifier 107 cannot be expected to perform its normal operation. In this case, however, the control signal ($V_2$, $V_4$) has a sufficiently large value, permitting the phase modulation degree stabilizing circuit to operate normally.

On the other hand, when the phase difference $\Delta\phi$ is $m/2\pi$ (where m=0, ±1, ±2, . . .) and its vicinity, the control signal ($V_2$, $V_4$) is zero or very small and the system using the output of the differential amplifier 51 cannot be expected to perform its normal operation. In this case, however, the control signal ($V_1$, $V_3$) has a sufficiently large value, enabling the phase modulation degree stabilizing circuit to operate normally.

Accordingly, even if the dynamic range is enlarged and the phase difference $\Delta\phi$ increases correspondingly, the phase modulation degree can be maintained stable over the entire range.

Figure 13:
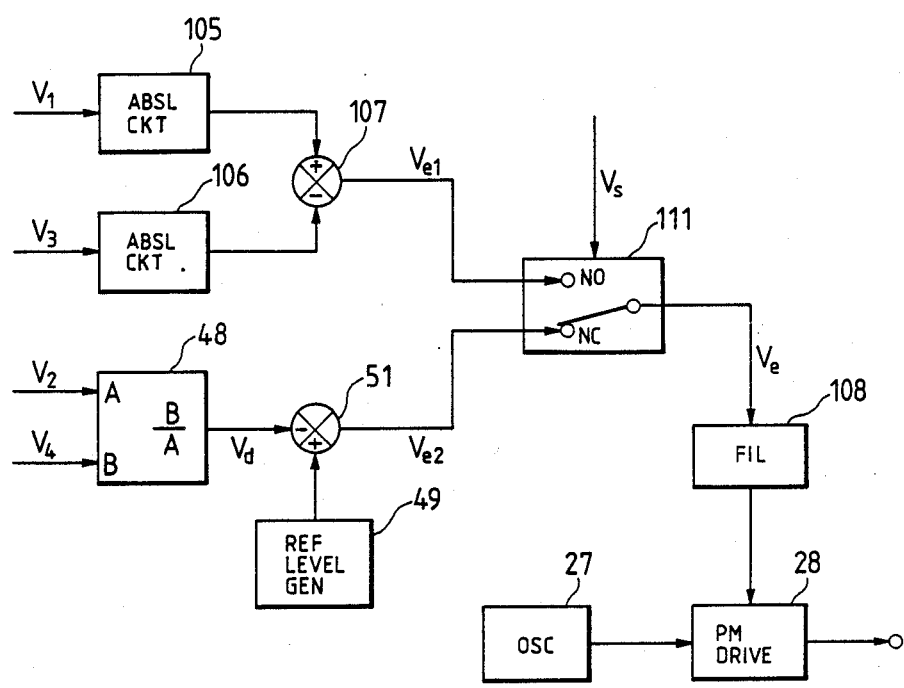
FIG. 13 is a block diagram showing a part of a modified form of the fiber optic gyro depicted in FIG. 12.

FIG. 13 illustrates another embodiment of the present invention. The error signal $V_{e1}$ from the differential amplifier 107 and the error signal $V_{e2}$ from the differential amplifier 51 are selectively applied to the electric filter 108 via a switch 111. When the phase difference $\Delta\phi$ is in the range of around $\pm\pi/4$ about $\pm m\pi$ (where m=0, 1, 2, . . .), the switch 111 is turned ON at its NC (Normally Closed) side, permitting the passage therethrough of the error signal $V_{e2}$ from the differential amplifier 51, whereas when the phase difference $\Delta\phi$ is in the range of around $\pm\pi/4$ about $\pm(2+1)\cdot\pi/2$ (where m=0, 1, 2, . . .), the switch 111 is turned ON at its NO (Normally Open) side, permitting the passage therethrough of the error signal $V_{e1}$ from the differential amplifier 107. In this fashion, the phase modulation degree stabilizing circuit can be operated normally over the entire input range, ensuring the stabilization of the phase modulation degree. The switch 111 may be changed over by the output D of the reversible counter 70 in FIG. 2.

Figure 14:
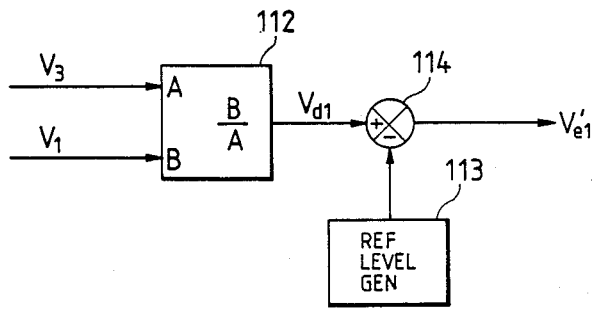
FIG. 14 is a block diagram showing a part of another modified form of the fiber optic gyro depicted in FIG. 12.

FIG. 14 shows a modified form of the section associated with the differential amplifier 107. The signals $V_1$ and $V_3$ are applied to a divider 112, wherein the signal $V_1$ is divided by the signal $V_3$. The output $V_{d1}$ of the divider 112 is given as follows:

$$V_{d1}=K_1\cdot J_1(x)\cdot\sin\Delta\phi/K_3\cdot J_3(x)\cdot\sin\Delta\phi \qquad (20)$$

Setting $K_1=K_3$ gives $V_{d1}=J_1(x)/J_3(x)$, establishing between the Bessel functions $J_1(x)$ and $J_3(x)$ a constant relationship independent of the input angular velocity.

Figure 15:
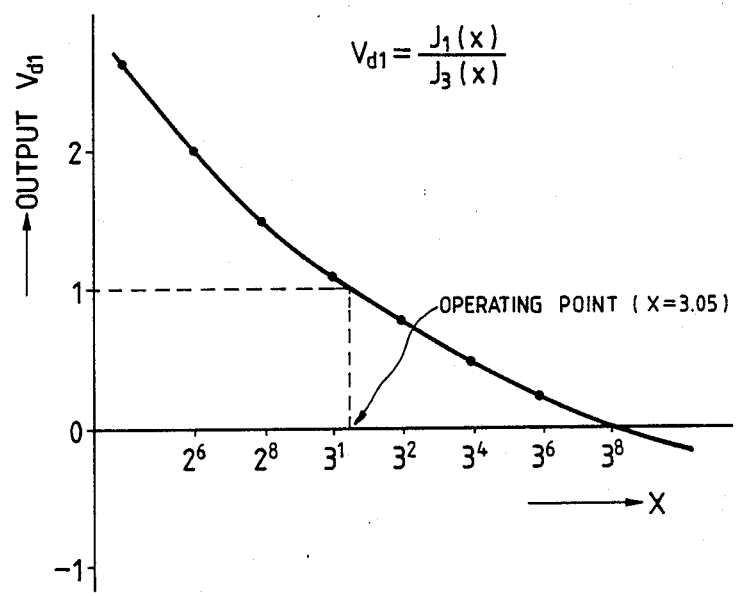
FIG. 15 is a graph showing its $V_{d1} - X$ characteristic.

FIG. 15 is a graph showing the relationship of $V_{d1}=J_1(x)/J_3(x)$ to the value x, and the value of the output $V_{d1}$ at the operating point (x=3.05) is 1.

Then, the reference value of a reference level generator 113 is set to 1, the reference value is compared with the output $V_{d1}$ in a differential amplifier 114, and the difference thus detected is negatively fed back to the phase modulator drive circuit 28 via the electric filter 108 to thereby change the voltage which is applied to the phase modulator 15. By this, the output $V_{d1}$ can be set to 1 at all times. In other words, the value x can be held at 3.05 as is the case with the FIG. 12 embodiment. In the embodiment shown in FIG. 14 the signal $V_1$ is divided by the signal $V_3$, but even if the signal $V_3$ is divided by the signal $V_1$, the automatic control loop can similarly be formed. In this instance, the value of the output $V_{d1}$ at the operating point (x=3.05) is 1 as in the above case and the reference value of the reference level generator 113 is set to 1.

The output of the divider 112 is usually multiplied $K_d$ times larger than the value of $V_{d1}$; therefore, the reference value of the reference level generator 113 is also set to a $K_d$-fold value.

Figure 2:
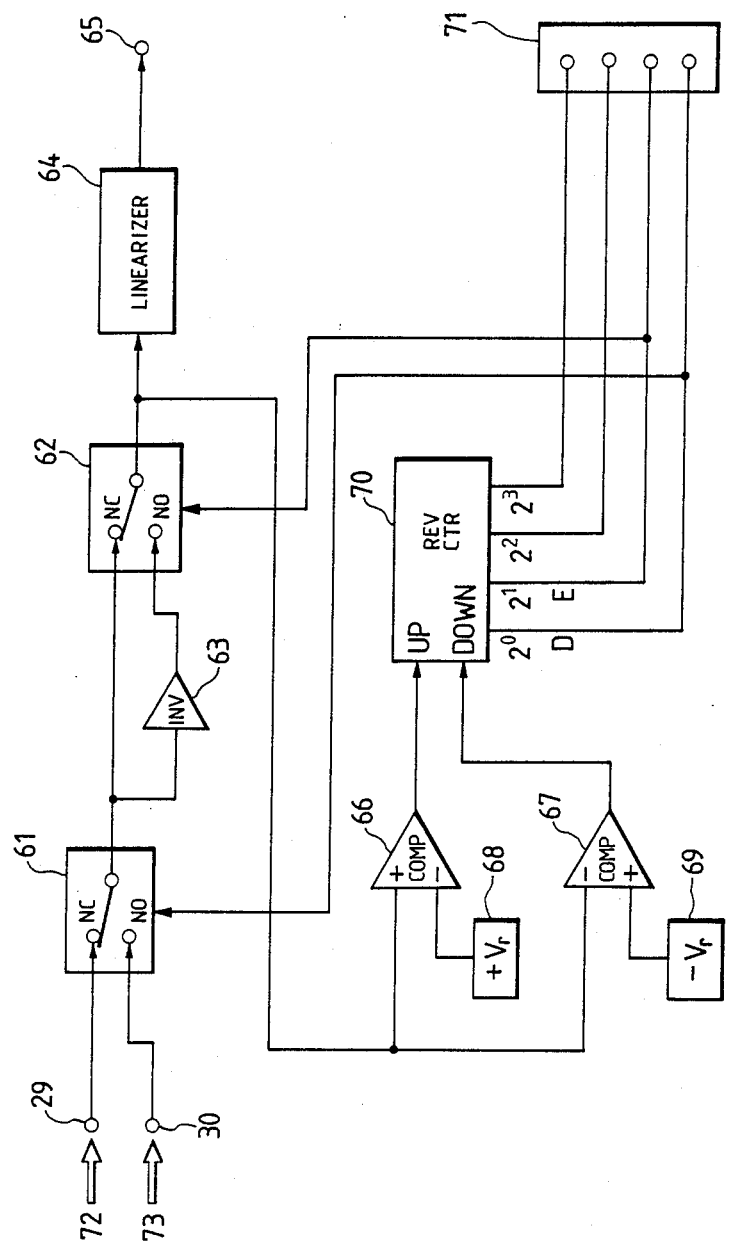
FIG. 2 is a block diagram showing the principal part of the conventional fiber optic gyro with an enlarged measurement range.
Figure 3:
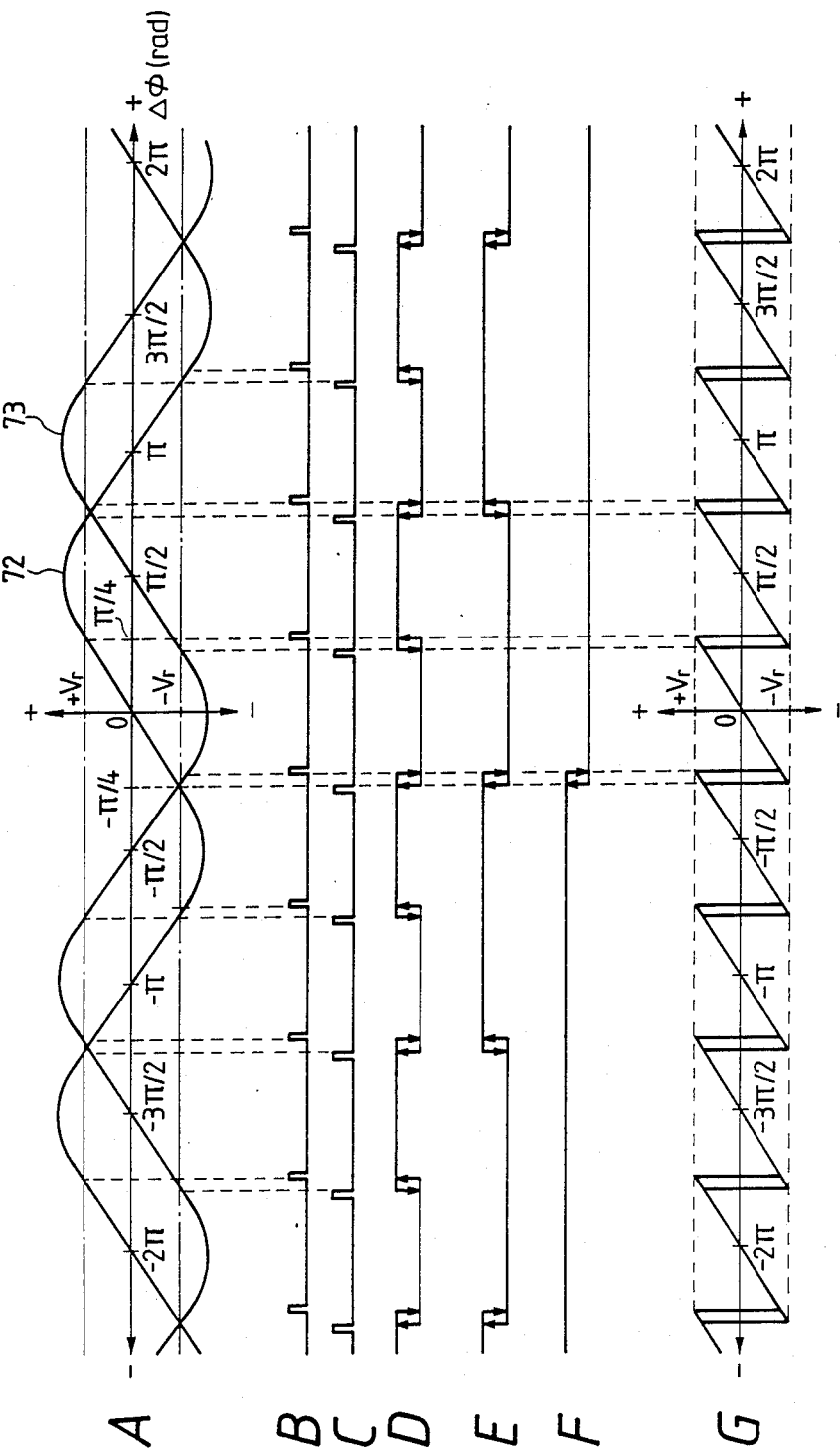
FIG. 3 shows a series of waveforms occurring at respective parts of the gyro shown in FIG. 2, for explaining its operation.
Figure 16:
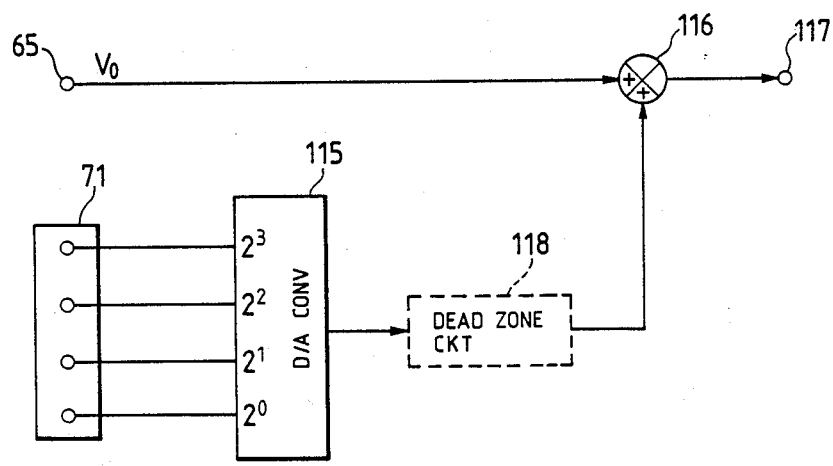
FIG. 16 is a block diagram illustrating a part of still another embodiment of the present invention.

FIG. 16 illustrates still another embodiment of the present invention, in which the input terminal 65 is supplied with the output from the terminal 65 in FIG. 2, that is, the signal shown in FIG. 3G. The terminal 71 is supplied with the output of the reversible counter 70 in FIG. 2, by which a D-A converter 115 yields a signal shown in FIG. 17B. The D-A converter 115 outputs a DC voltage $m\pi/(2K)$ (volts) corresponding to $m\pi/2$ (where m=0, $\pm1$, $\pm2$, . . .) in Eq. (6).

Figure 17:
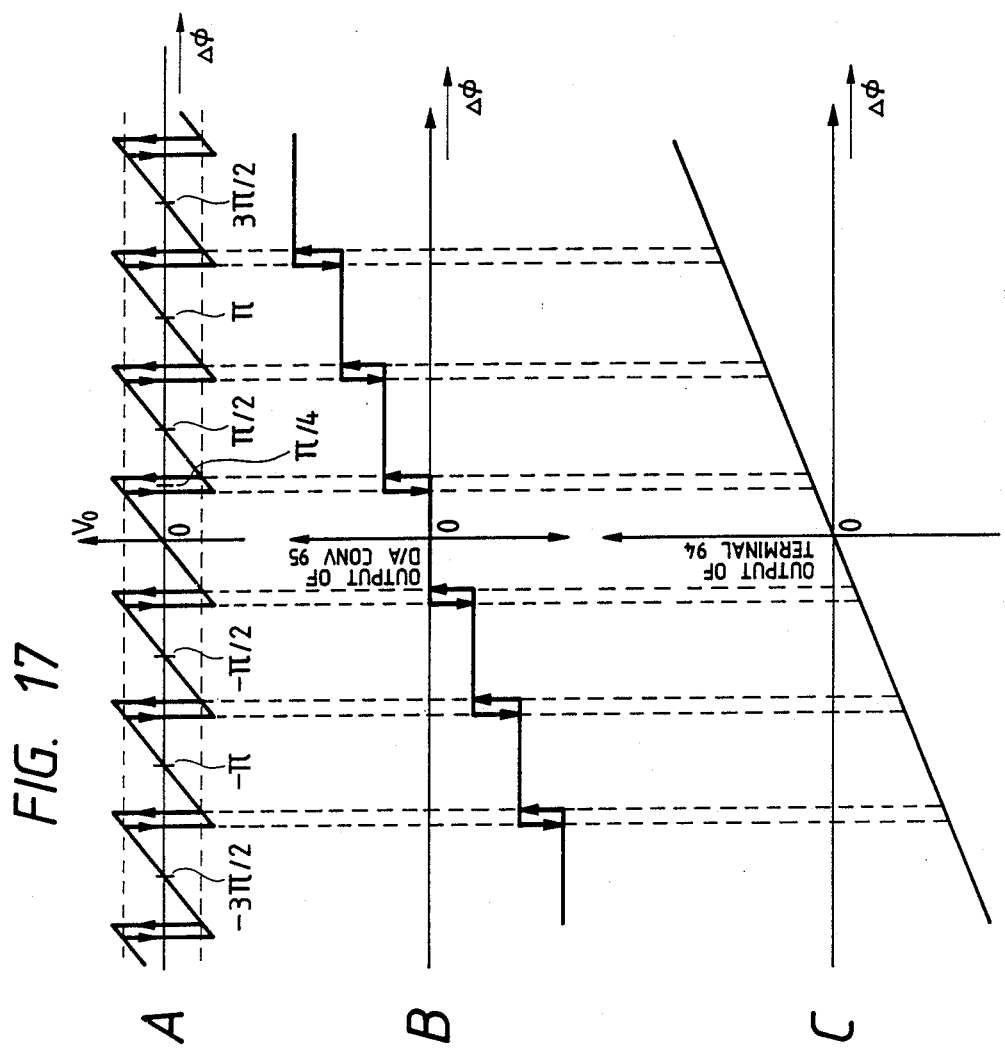
FIG. 17 is a waveform diagram, for explaining its operation.

The signal $V_0$ applied to the terminal 65 and the output of the D-A converter 115 are added together by an adder 116, at the output of which there can be obtained a continuous output with respect to the phase difference $\Delta\phi$ as shown in FIG. 17C.

The D-A converter 115 delivers the output shown in FIG. 17B, but in order to prevent that a bias change at the time of zero voltage appears at an output terminal 117 of the fiber optic gyro, a dead zone circuit 118 may be provided at the output side of the D-A converter 115.

It will be apparent that many modifications and variations may be effected without departing from the scope of the novel concepts of the present invention.

What is claimed is:

1. A fiber optic gyro comprising:
a circular optical path of at least one loop;
means for allowing light waves to pass through the optical path in both clockwise and counterclockwise directions;
interference means whereby the light waves having passed through the optical path are made to interfere with each other;
phase modulating means connected in cascade between the interference means and one end of the optical path, for phase modulating both light waves;
photoelectric conversion means for converting the intensity of the interference light into an electric signal;
first synchronous detecting means whereby a fundamental frequency component of a modulation frequency of the phase modulating means, contained in the output signal of the photoelectric conversion means, is synchronously detected and a signal corresponding to an input angular velocity is produced;
second and third synchronous detecting means whereby second and third harmonic components of the modulation frequency of the phase modulating means, contained in the output signal of the photoelectric conversion means, are synchronously detected, respectively; and
means for controlling the phase modulating means so that the ratio between the output from the second synchronous detecting means and the output from the third synchronous detecting means is always equal to a preset reference value.

2. A fiber optic gyro comprising:
a circular optical path of at least one loop;
means for allowing light waves to pass through the optical path in both clockwise and counterclockwise directions;
interference means whereby the light waves having passed through the optical path are made to interfere with each other;
phase modulating means connected in cascade between the interference means and one end of the optical path, for phase modulating both light waves;
a photodetector for detecting, as an electric signal, the intensity of the interference light;
first synchronous detecting means whereby an odd-numbered harmonic component of the modulation frequency of the phase modulating means, contained in the photodetector output, is synchronously detected;
second synchronous detecting means whereby an even-numbered harmonic component of the modulation frequency of the phase modulating means, contained in the photodetector output, is synchronously detected; and
control means responsive to a signal from the second synchronous detecting means to effect control so that an input signal and a reference signal both applied to the first synchronous detecting means become substantially in-phase with each other and an input signal and a reference signal both applied to the second synchronous detecting means are displaced substantially 90 degrees apart in phase.

3. A fiber optic gyro comprising:

a circular optical path of at least one loop;

means for allowing light waves to pass through the optical path in both clockwise and counterclockwise directions;

interference means whereby the light waves having passed through the optical path are made to interfere with each other;

phase modulating means connected in cascade between the interference means and one end of the optical path, for phase modulating both light waves;

photoelectric conversion means for detecting, as an electric signal, the intensity of the interference light;

first synchronous detecting means whereby a desired odd-numbered harmonic component of the modulation frequency of the phase modulating means, contained in the output from the photoelectric conversion means, is synchronously detected;

second synchronous detecting means whereby a desired even-numbered harmonic component of the modulation frequency of the phase modulating means, contained in the output from the photoelectric conversion means, is synchronously detected;

third synchronous detecting means for detecting the output of the photoelectric conversion means by a reference signal 90 degrees out of phase with a reference signal of the first synchronous detecting means;

fourth synchronous detecting means for detecting the output of the photoelectric conversion means by a reference signal 90 degrees out of phase with a reference signal of the second synchronous detecting means;

first phase detecting means whereby information on a phase difference between the reference signal and the synchronously detected component of the input signal of the first synchronous detecting means is obtained on the basis of the outputs from the first and third synchronous detecting means;

second phase detecting means whereby information on a phase difference between the reference signal and the synchronously detected component of the input signal of the second synchronous detecting means is obtained on the basis of the outputs from the second and fourth synchronous detecting means; and control means responsive to the output signals of the first and second phase detecting means to effect control so that the reference signals and the synchronously detected components in the first and second synchronous detecting means are always in phase with each other.

4. The fiber optic gyro of claim 3, wherein the first phase detecting means is means for multiplying the outputs of the first and third synchronous detecting means and the second phase detecting means is a means for multiplying the outputs of the second and fourth synchronous detecting means.

5. The fiber optic gyro of claim 3, wherein the first phase detecting means is means for inverting the polarity of the output of the third synchronous detecting means according to the polarity of the output of the first synchronous detecting means and the second phase detecting means is means for inverting the polarity of the output of the fourth synchronous detecting means according to the polarity of the output of the second synchronous detecting means.

6. The fiber optic gyro of any one of claims 3 to 5, further including: first range detecting means for detecting that a phase difference between the light waves, depending on an input angular velocity applied to the optical path in its circumferential direction, is in the range of approximately $\pm\pi/4$ about $\pm m\pi$ (where $m=0, 1, 2, \ldots$), second range detecting means for detecting that the phase difference between the light waves is in the range of approximately $\pm\pi/4$ about $\pm(2m+1)\cdot\pi/2$ (where $m=0, 1, 2, \ldots$); and means responsive to the output from the first range detecting means to apply the output from the second phase detecting means to the control means and responsive to the output from the second range detecting means to apply the output from the first phase detecting means to the control means.

7. A fiber optic gyro comprising:

a circular optical path of at least one loop;

means for allowing light waves to pass through the optical path in clockwise and counterclockwise directions;

interference means whereby the light waves having passed through the optical path are made to interfere with each other;

phase modulating means connected in cascade between the interference means and one end of the optical path, for phase modulating the both light waves;

photoelectric conversion means for detecting, as an electric signal, the intensity of the interference light;

first and second synchronous detecting means whereby adjacent even-numbered harmonic components of the modulation frequency of the phase modulating means, contained in the output from the photoelectric conversion means, are synchronously detected;

third and fourth synchronous detecting means whereby adjacent even-numbered harmonic components of the modulation frequency of the phase modulating means, contained in the output from the photoelectric conversion means, are synchronously detected;

first phase modulation control means whereby a voltage which is applied to the phase modulator is controlled so that the outputs from the first and second synchronous detecting means become equal to each other; and second phase modulation control means whereby a voltage which is applied to the phase modulator is controlled so that the ratio between the outputs from the third and fourth synchronous detecting means becomes constant.

8. The fiber optic gyro of claim 7, including third phase modulation control means in place of the first phase modulation control means.

9. A fiber optic gyro comprising:

a circular optical path of at least one loop;

means for allowing light waves to pass through the optical path in both clockwise and counterclockwise directions;

interference means whereby the light waves having passed through the optical path are made to interfere with each other;

phase modulating means connected in cascade between the interference means and one end of the optical path, for phase modulating both light waves;

photoelectric conversion means for detecting, as an electric signal, the intensity of the interference light;

first, second and third synchronous detecting means whereby first, second and third harmonic components of the modulation frequency of the phase modulating means, contained in the electric signal converted by the photoelectric conversion means, are synchronously detected;

adding means whereby the output from the third synchronous detecting means is set to a value about 2.2 times larger than the output from the first synchronous detecting means and is added to the latter; and means whereby the outputs of the adding means and an electric circuit provided at a stage preceding the second synchronous detecting means or the quantity of light reaching the photoelectric conversion means is controlled so that the sum of squared values of the outputs from the second synchronous detecting means and the adding means becomes constant.

10. The fiber optic gyro of claim 9, further including means whereby a deviation of the absolute quantity of the composite vector of the outputs of the adding means and the second synchronous detecting means from a reference value is obtained and the output of the fiber optic gyro is numerically corrected.

* * * * *